United States Patent
Gysi

(12) 
(10) Patent No.: US 6,417,482 B1
(45) Date of Patent: Jul. 9, 2002

(54) METHOD AND DEVICE FOR PRODUCING PIPES

(75) Inventor: Peter Gysi, Bellikon (CH)

(73) Assignee: Elpatronic AG, Bergdietikon (CH)

( * ) Notice: Subject to any disclaimer, the term of this patent is extended or adjusted under 35 U.S.C. 154(b) by 0 days.

(21) Appl. No.: 09/623,435

(22) PCT Filed: Feb. 17, 1999

(86) PCT No.: PCT/CH99/00078

§ 371 (c)(1),
(2), (4) Date: Sep. 1, 2000

(87) PCT Pub. No.: WO99/44763

PCT Pub. Date: Sep. 10, 1999

(30) Foreign Application Priority Data

Mar. 4, 1998 (CH) .............................................. 513/98
Dec. 2, 1998 (CH) ............................................. 2397/98

(51) Int. Cl.⁷ ............................................. B23K 26/00
(52) U.S. Cl. ................................ 219/121.63; 219/59.1; 219/121.64; 219/121.83
(58) Field of Search ................... 219/121.63, 121.64, 219/121.82, 121.78, 59.1, 124.34, 121.83; 228/8, 17.5, 102, 103, 173.6

(56) References Cited

U.S. PATENT DOCUMENTS 4,205,216 A * 5/1980 Douglas .................. 219/121.6
4,959,521 A 9/1990 Maruyama ............. 219/121.63

FOREIGN PATENT DOCUMENTS

| EP | 0245145 A1 | | 4/1987 | |
| EP | 4223247 A1 | | 1/1994 | |
| EP | 0743129 A2 | | 5/1996 | |
| JP | 58-112664 A | * | 7/1983 | ............ 219/124.34 |
| JP | 59-112209 A | * | 6/1984 | |
| JP | 2-37973 A | * | 2/1990 | ............ 219/124.34 |
| JP | 02076648 | | 3/1990 | |
| JP | 04118191 | | 4/1992 | |
| JP | 8-267246 A | * | 10/1996 | |
| JP | 09029477 | | 2/1997 | |
| WO | WO 98/26898 | | 6/1998 | |

* cited by examiner

Primary Examiner—Geoffrey S. Evans
(74) Attorney, Agent, or Firm—McCormick, Paulding & Huber LLP

(57) ABSTRACT

A number of tubes that are about to be welded, or have already been welded, are positioned on a table. The seam of each tube is welded by a laser welding unit. While one tube is being welded, it is possible to load the other positions of the table with tubes for welding and/or to unload tubes that have already been welded. This makes it possible to obtain optimum utilization of the laser welding unit. A sensor is used to detect the positioning of the welding edges and a tube is rotated if necessary to properly position the tube for welding.

6 Claims, 1 Drawing Sheet

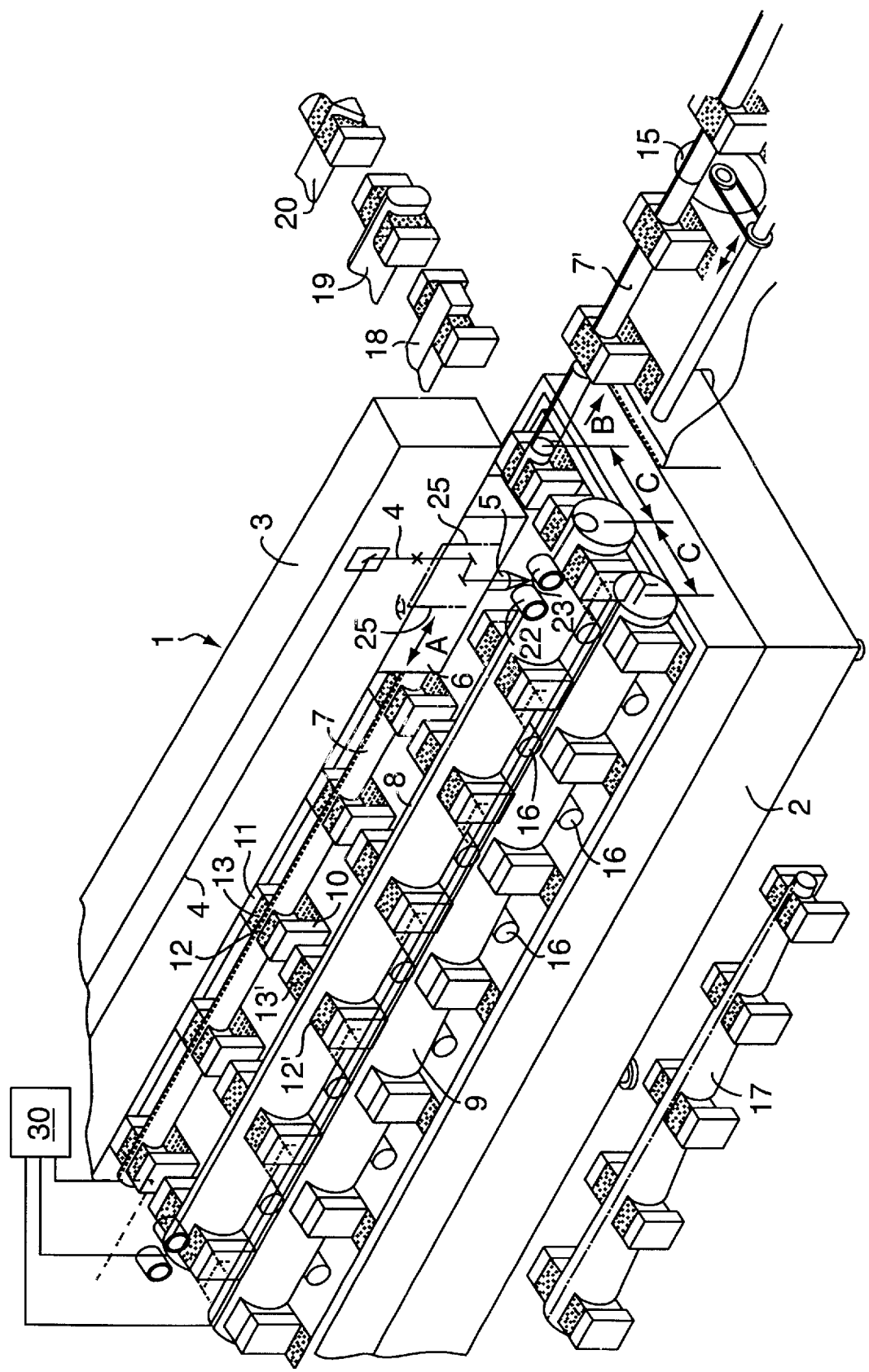

METHOD AND DEVICE FOR PRODUCING PIPES

BACKGROUND

It is known that bodies formed by bending sheet-metal blanks into tubular shapes may be welded by laser along their longitudinal seam, particularly with a butt joint, so that welded tubes are formed. These tubes, whose cross-section may be of any desired shape, can be formed, particularly by a subsequent hydroforming process, into shaped bodies that can be used in various fields, and particularly in motor vehicle body construction. JP 02076648 A shows an apparatus with two working zones for coiling and welding strips around an object. Coiling takes place in one zone, and welding in the other. JP 04118191 A shows the welding of various tube sections which are arranged and aligned coaxially one after another for welding. JP 09029477 A shows tube welding with a revolver-like rotatable holder for several tubes. WO-A 98/26898 shows the welding of flat parts that are fixed adjacent to one another on tables, by means of a single laser able to serve both tables.

It is an object of the invention to provide a more efficiently designed apparatus for the manufacture of tubes.

SUMMARY OF THE INVENTION

According to the invention, the foregoing object can be realized by apparatus including a table having a holding means arranged for parallel holding of at least two tubes, and a laser beam source whose laser beam emission head, which is arranged above the table, is traversable in the longitudinal direction of the table and is traversable in the transverse direction by traversing one of the emission head and the table. The holding means have clamping jaws that can be shifted into position towards and away from one another. A device is provided for detecting the position of the welding edges of tubes over the length of the tube.

The invention also can include methods practiced in accordance with the teachings herein. In one method for welding the longitudinal seam of tubes by means of a laser beam, a table is provided which has holding means arranged for parallel holding of at least two tubes, and a laser beam source whose laser beam emission, which is arranged above the table, is traversable in the longitudinal direction of the table and is traversable in the transverse direction by traversing of one of the emission head and the table. The holding means have clamping jaws that can be shifted into position towards and away from one another, and a device is provided for detecting the position of the welding edges of tubes over the length of the tube. A tube to be welded is loaded into the parted clamping jaws and positioned in the clamping jaws by at least one of: shifting it forward and back; and rotating it, as directed by the device for detecting the position of the edges, until the correct welding position of the tube is obtained, and in that the clamping jaws are then closed and the tube is welded.

BRIEF DESCRIPTION OF THE DRAWING

Embodiments of the invention given by way of example will now be described in detail with reference to the sole FIGURE.

The FIGURE shows a schematic perspective view of an apparatus 1 for the laser welding of tubes.

DETAILED DESCRIPTION OF THE PREFERRED EMBODIMENTS

The apparatus has a table 2 and a laser welding unit 3 arranged above it. The laser welding unit 3 has a laser source (not shown) from which the laser beam 4 is directed to its emission head 5. The emission head 5 of the laser welding unit is arranged on a carriage 6 which can be traversed back and forth in the directions of the arrow A to carry out the welding.

The table 2 has a number of holding positions for tubes 7, 8, 9. The tubes are arranged parallel on the table 2. Holding means are provided for securing the tubes on the table. The holding means for each tube may comprise a plurality of clamping jaws 10 and 11 each provided with shaped pieces 12 and 13 adapted to the shape and diameter of the individual tube. Thus, shaped pieces 12' and 13' are provided for the tube 8, instead of the shaped pieces 12 and 13 used for the tube 7. The invention offers—and the embodiment shows—a highly flexible machine concept that is also very well suited for small production runs and also for laboratory work. With this in mind, the clamps are designed and constructed so that the shaped pieces can be changed within a short time; and, as the example shows, different shaped pieces can be fitted at the same time. The clamping jaws 10, 11 (and the other clamping jaws shown without reference numbers) can be shifted into position towards and away from one another to receive and hold the individual tube and release it after welding. Tubes are positioned on the table in the rounded and as yet unwelded condition by a loading apparatus (not shown). At this stage, the clamping jaws are still sufficiently wide open for the tube to be loaded and positioned as required by shifting it forward and back, and if need be by rotating it about its longitudinal axis. To obtain the best possible welded joint, a device 30 operating at least semi-automatically or operating as a control or regulating device is preferably provided which detects the position of the welding edge over the entire length of the tube, preferably contactlessly by means of optical sensors, and modifies the position of the tube in the positioning/clamping operation. Once the tube to be welded is in the welding position, the clamping jaws with the shaped pieces mounted thereon are closed sufficiently to hold the tube in the correct position for welding. Contact by the shaped pieces of the clamps with the outer cylindrical surface of the tube is preferably only partial and is preferably non-metallic (i.e. the shaped pieces are made of plastic material), to avoid damaging the surface of the tube.

The operations of loading and receiving the tubes and securing them on the table are controlled by a control device, and in particular by computer. During welding, the laser may be made to follow the adjoining welding edges in a known manner by means of a seam tracking system 25. After welding, the clamping jaws are released again and the tube is then removed from the table by an unloading device (not shown in detail). This is schematically indicated in the drawing for the tube 7 by the arrow B pointing in the unloading direction and the tube 7' showing the tube in the unloaded position. The unloaded tube may be cut into various desired lengths e.g. by a cutting device 15 which is only shown schematically in the drawing.

This table with its plurality of mounting positions for tubes allows welding to be performed simultaneously with loading and unloading. Thus, in the illustrated example, the tube 8 can be welded while the tube 7 that has already been welded is being unloaded. At the same time, the as yet unwelded tube 9 can be loaded on to the table and secured with the corresponding clamping jaws. However, the loading, welding and unloading cycles may follow one another in succession, instead of being performed simultaneously, or they may be performed in combination, e.g. with simultaneous loading and unloading of, in each case, one tube, followed by welding of one tube; [either of] which will prevent the welding from being affected by shocks due to loading or unloading. The method and/or apparatus make it possible to obtain optimum utilization of the laser welding plant. Thus, in the example shown, after the laser has completed the welding of the tube 8, it can be made to proceed directly to the welding of the tube 9, e.g. by traversing the table 2 in a direction indicated by the arrow C to locate the laser head over the welding edges of the tube 9. While the tube 9 is being welded, the tube 8 that has already been welded can be unloaded, and e.g. a fresh tube can simultaneously be put on the table by the loading device to replace the tube shown as tube 7. After the tube 9 has been welded, the table can then be traversed again so that the tube which has taken the place of tube 7 can be welded, while the tube that has already been welded is unloaded. Unloading can be effected e.g. by table-mounted power-driven rollers 16, which are shown for the tube 9 as an example. Of course, instead of moving the table 2 transversely with respect to the welding direction, it is also possible to provide a fixed table and to traverse the welding unit accordingly. In this case i.e. if the table is stationary, the loading and unloading devices will need to be traversable also.

The method and/or apparatus make it possible e.g. to weld alternately a tube with a smaller diameter and a tube with a larger diameter. This can be done always at the same table position for each tube diameter, and unloading can also be organized accordingly so that the welded tubes are already sorted by diameter when they leave the shop or go into interim storage.

The illustrated arrangement and/or method with their capacity for several tubes enable utilization of the welding unit, and its adaptation to the bending unit, to be optimized. The bending unit for the tubes is essentially time-dependent on the diameter of the tubes, not on their length. The welding, on the other hand, is time-dependent on the length of the welded seam to be produced. The method and/or arrangement which have been described allow optimal coordination of these operations. Buffer storage or a transfer device may be arranged upstream of the loading device for the table 2, to provide interim storage for bent tubes. Buffer storage or a transfer device may also be provided at the discharge end of the table 2.

The FIGURE moreover shows how the clamping jaws with shaped pieces can also be used for easy clamping of a tapered bent tube 17, which is shown schematically alongside the table in order to illustrate this possibility. It is possible to adapt flexibly to different tube diameters or even to tapered tubes, simply by replacing the shaped pieces 12, 13. It is likewise possible to adapt to tubes with a different cross-sectional profile by replacing the shaped pieces. This is also indicated schematically alongside the table in the FIGURE, by means of the tubes 18, 19 and 20 (only partly shown), which have a non-round profile and are held by correspondingly formed shaped pieces 12, 13.

For the quality of the laser welding, it is essential that the opposing edge faces of the bent sheet-metal blank should not be out of parallel with one another (i.e. should not form a vee) by more than a tolerable amount. This is especially important where the laser welded tubes are subjected to a further forming process, and in particular a hydroforming process, in which the weld seam can be subjected to a correspondingly high loading. Therefore the edges of the bent sheet-metal blanks are preferably acted on in the region of the laser emission head 5 so that the edge faces are essentially parallel with one another in the welding zone. This is indicated in the FIGURE by the rolls or rollers 22 and 23, which impinge on the edges to a greater or lesser degree thus giving a parallel alignment of the edge faces so that laser welding can be conducted within the range of permissible tolerance. Instead of the rolls shown (preferably two in number), other means of impinging on the edges may be provided. The rolls may for example be set at an adjustable fixed height which corresponds to the preferred edge-orientation.

Instead of the arrangement shown with its three tube-receiving positions, it is possible to provide two receiving positions only, or more than three receiving positions. It is also possible to provide more than one laser welding unit. Any type of laser source, e.g. $CO_2$ and YAG lasers, can be adopted. In principle, it is possible to produce a lap-welded seam instead of the butt-welded seam that has been described. The tubes to be welded may be formed e.g. from sheet steel, chromium steel or aluminium. Possible sizes include in particular tubes with a diameter of 6 cm to 20 cm, a length of 50 cm to 3 m and a sheet-metal thickness of 0.6 to 2 mm, although other dimensions are of course also possible.

What is claimed is:

1. Apparatus for welding the longitudinal seam of tubes by means of a laser beam, comprising:

a table having a holding means arranged for parallel holding of at least two tubes, a laser beam source whose laser beam emission head, which is arranged above the table, is traversable in the longitudinal direction of the table and is traversable in the transverse direction by traversing one of the emission head and the table, wherein the holding means have clamping jaws that can be shifted into position towards and away from one another, and a device for detecting the position of the welding edges of tubes over the length of the tube.

2. Apparatus according to claim 1, wherein the holding means are provided with exchangeable shaped pieces which have a shape matching a predetermined tube outer profile.

3. Method for the operation of an apparatus for welding the longitudinal seam of tubes with a laser beam, in which apparatus a table is provided which has holding means arranged for parallel holding of at least two tubes, and a laser beam source whose laser beam emission head, which is arranged above the table, is traversable in the longitudinal direction of the table and is traversable in the transverse direction by traversing of either the emission head and the table, wherein the holding means have clamping jaws that can be shifted into position towards and away from one another, and a device is provided for detecting the position of the welding edges of tubes over the length of the tube, and wherein a tube to be welded is loaded into the parted clamping jaws and positioned in the clamping jaws by at least one of: shifting it forward and back; and rotating it, as directed by the device for detecting the position of the edges, until the correct welding position of the tube is obtained, and in that the clamping jaws are then closed and the tube is welded.

4. Method according to claim 3 wherein while one tube is being welded, unloading of a tube that has already been welded is effected.

5. Method according to claim 4 wherein while one tube is being welded, loading and positioning of another tube for welding are also effected.

6. Method according to claim 3 wherein a tube for welding is loaded and a welded tube is simultaneously unloaded in a first step, and the tube is welded in a second step, after which the first step is repeated.

* * * * *